United States Patent [19]
Takebe

[11] Patent Number: 5,357,517
[45] Date of Patent: Oct. 18, 1994

[54] ERROR DISPLAY DEVICE OF DATA TRANSMISSION SYSTEM

[75] Inventor: Makoto Takebe, Kanagawa, Japan

[73] Assignee: Kabushiki Kaisha Komatsu Seisakusho, Tokyo, Japan

[21] Appl. No.: 862,553

[22] PCT Filed: Dec. 26, 1990

[86] PCT No.: PCT/JP90/01706
§ 371 Date: Jun. 23, 1992
§ 102(e) Date: Jun. 23, 1992

[87] PCT Pub. No.: WO91/10301
PCT Pub. Date: Jul. 11, 1991

[30] Foreign Application Priority Data

Dec. 26, 1989 [JP] Japan .................................. 1-336887

[51] Int. Cl.$^5$ .............................................. H04L 1/00
[52] U.S. Cl. .................................. 371/5.1; 340/825.16; 371/20.1
[58] Field of Search ...................... 371/29.1, 20.1., 5.1; 395/575; 340/825.16

[56] References Cited

FOREIGN PATENT DOCUMENTS 55-115755 2/1979 Japan .
56-75751 11/1979 Japan .
58-154949 3/1982 Japan .
61-131931 12/1984 Japan .
62-25531 7/1985 Japan .

OTHER PUBLICATIONS

International Preliminary Examination Report.
International Search Report.

*Primary Examiner*—Stephen M. Baker
*Attorney, Agent, or Firm*—Diller, Ramik & Wight

[57] ABSTRACT

An error display device of a data transmission system in which a plurality of nodes are connected to a main controller to transmit data, the main controller being adapted to discriminate an error content and an error position from an error signal contained in a data frame signal transmitted from the nodes and to display the error content and position. Since it is so arranged that the storage content of temporary memory for temporarily storing therein a signal corresponding to the error content and the error position is not updated each time the error signal is inputted but updated intermittently according to an operator's instruction, even when errors frequently take place at a multiplicity of locations, that is, even when it is difficult for an operator to confirm error display contents, the operator can reliably confirm the error contents.

2 Claims, 4 Drawing Sheets

| (a) S0 | STI | STO | DO1 | DO2 | DO3 | DO4 | DO5 | SP | CRC | ERR |
| --- | --- | --- | --- | --- | --- | --- | --- | --- | --- | --- |
| (b) S1 | STI | DI1 | STO | DO2 | DO3 | DO4 | DO5 | SP | CRC | ERR |
| (c) S2 | STI | DI2 | DI1 | STO | DO3 | DO4 | DO5 | SP | CRC | ERR |
| (d) S3 | STI | DI3 | DI2 | DI1 | STO | DO4 | DO5 | SP | CRC | ERR |
| (e) S4 | STI | DI4 | DI3 | DI2 | DI1 | STO | DO5 | SP | CRC | ERR |
| (f) S5 | STI | DI5 | DI4 | DI3 | DI2 | DI1 | STO | SP | CRC | ERR |

ERROR DISPLAY DEVICE OF DATA TRANSMISSION SYSTEM

TECHNICAL FIELD

The present invention generally relates to a data transmission system in which a plurality of nodes are connected to a main controller to transmit data and, more particularly, to an error display device of a series control system which can suitably display various sorts of errors under control of the main controller.

BACKGROUND ART

In the case where it is desirable to control presses, machine tools, construction machines, ships, airplanes, unmanned or automatic carriers, unmanned warehouses or so on an integrated data processing basis, a multiplicity of sensors for detecting the states of the respective machines or warehouses and a multiplicity of actuators for controlling the states thereof become necessary. The number of such sensors and actuators amounts, in the case of the presses for example, to more than 3000 and in other cases, amounts to much more than the above.

Conventionally, there has been considered an integrated data processing system for controlling such sorts of machines or items on an integrated data processing basis, in which a plurality of nodes are connected in series, each of the nodes is connected to one or a plurality of sensors and actuators, and these nodes are connected in a ring form through a main controller so that each node is controlled by a signal received from the main controller.

In the case where the nodes are connected in series in this way, it becomes important how to secure the simultaneousness of outputs of the respective-sensors as well as the simultaneousness of control of the actuators. For example, when such an arrangement is considered that addresses are allocated to the respective notes and the nodes are controlled on the basis of the addresses, a time delay taken for the address processing becomes a problem, which results in that the satisfactory simultaneousness cannot be secured with respect to the collection of the outputs of the sensors and the control of the actuators.

To solve the problem, the inventors of the present application have suggested a series control system which nodes are connected in series, an idea of allocating addresses to the nodes is discarded and instead the nodes are identified by their connection sequence, whereby the need for address processing can be eliminated, the problem of the time delay caused by the address processing can be removed, and further the node structure can be remarkably simplified.

Such a series control system is arranged as shown in FIG. 4.

The series control system is suitably used in a centralized control system for controlling a press. In the system, a host controller 200 performs general control respective portions of the press. A main controller 100 controls data transfer with a plurality of nodes 10-1 to 10-N connected thereto. Groups of sensors 1-1, 1-2, . . . , and 1-N are provided to the respective portions of the press to detect the states of the press. Groups of actuators 2-1, 2-2, . . . , and 2-N are provided to the respective portions of the press to drive the associated presses. The sensor group 1-N and the actuator group 2-N are connected to the associated nodes 10-N (N=1 N) which in turn are connected in a loop form together with the main controller 100.

FIG. 5 shows frame structures of a data signal used in the system when the number N of nodes are set to be 5. The data frame signal is issued from the main controller 100, passed through the nodes 10-1, 10-2, . . . , and 10-N and sent back to the main controller 100. FIG. 5(a) shows the data frame signal immediately after outputted from the main controller 100, FIGS. 5(b), (c), (d) and (e) show the data frame signals outputted from the nodes 10-1, 10-2, 10-3 and 10-4 respectively, and FIG. 5(f) shows the signal outputted from the node 10-5 (the signal to be fed back to the main controller 100 when N=5).

The contents of the respective signals having the frame structures of FIG. 5 are as follows.

STI; First start code indicative of the heading position of an input data (sensor data) DI DI; input data (sensor data)

DIq; Input data from a sensor connected to the q-th node

STO; Second start code indicative of the heading position of output data (actuator drive data)

DO; Output data (actuator drive data)

DOq; Output data to the actuator connected to the q-th node

SP; Stop code indicative of the terminating end position of a data string

CRC; CRC code for CRC check

ERR; Code indicative of error presence or absence, error content and error position The respective nodes 10-1 to 10-N shown in FIG. 4 operate to add the detection data DIq of the sensor 1 connected to the node to between the start codes STI and STO and to remove the output data DOq to the actuator 2 connected to the associated node from the output data immediately after the start code STO as shown in FIGS. 5 (b) to (f).

Accordingly, in this system, when such a data frame signal containing the actuator control data DO as shown in FIG. 5(a) is sent from the main controller 100 to the node 10-1, the data frame signal is sequentially propagated from the node 10-1 via the nodes 10-2, 10-3, 10-4 and to the node 10-5, which results in that the actuator control data DO in the data frame signal are allocated to the corresponding nodes and at the same time the detection data of the sensor group obtained at the respective nodes are taken into the data frame signal. As a result, when the data frame signal is fed back to the main controller 100, no actuator control data DO are contained in the frame signal and the detection data of the sensor group are contained in the frame signal as shown in FIG. 5(f).

The error code ERR in the data frame signal comprises, as shown in FIG. 6, a bit Ea indicative of the presence or absence of an error, an error content code Eb indicative of the contents of the error, and an error position area Ec indicative of the position of the error. When one of the nodes detects such an error as a communication error, this node sets the bit Ea at "1", sets the error content code Eb to have a code content corresponding to the generated error, and further initializes the error position area Ec to have such an initial value as "10 . . . 00) (which means a value "1", though the bit order is reversed). The data frame signal with such an error code ERR attached to the end thereof is sent to a next node in the next stage.

The node in the next stage, when receiving such an error code ERR, detects that the bit Ea in the error code ERR has a value "1", adds "1" to the data of the error position area Ec, and sends to a node in the next stage the data frame signal having the error code ERR attached to the end thereof. In this way, the subsequent nodes similarly operate to add "1" to the data of the received error position area Ec.

The data frame signal is thereafter applied to the main controller 100. The main controller 100 can know the generation of the error on the basis of the value "1" of the bit Ea, can know the error content on the basis of the error content code Eb, and also can know the position of the error generation on the basis of the value added by "1" to the data content of the error position area Ec. For example, in the system of FIG. 4, when N=5 and an error is detected at the node 10-3, the value added by "1" to the data content of the error position area Ec inputted to the main controller 100 corresponds to binary data indicative of a decimal number "4", so that the main controller 100 can detect the generation of the error at the node 10-3 through its reverse calculation.

When the main controller 100 detects the presence of an error in the data frame signal for the first time (when the bit Ea is "0" and the main controller 100 detects such an error as a CRC error), the error position area Ec has an eventual value of "1".

The initial set value and addition value of the error position area Ec at the nodes and the main controller are set by the following technique.

| Sn  | 1  | 0  | 2  |
|-----|----|----|----|
| ADn | +1 | +1 | +1 |
| ADm | +1 | +2 | +0 |
| Sm  | 1  | 1  | 1  |

Reference symbol Sn denotes the initial set value of the error position area Ec when the node detects an error, ADn denotes an addition value at the node, ADm denotes an addition value when the main controller detects that Ea=1, and Sm denotes the initial set value of the error position area Ec when the main controller detects an error for the first time.

With such a system, the main controller 100 is connected to an operating panel and a display unit for the input and output of various sorts of data, so that the contents of the generated error and the position of the error generation are displayed on the display unit. However, this prior art system is arranged so that the error content and error generation position discriminated at the main controller 100 are displayed directly on the display screen. That is, in this error display unit of the prior art, the display position corresponding to the error content and error generation position refers to one location, and the error contents and error generation positions at different time points reflect directly on the display contents.

For this reason, the prior art system has had a problem that, when errors frequently take place at a plurality of different locations, the error contents and error generation positions are frequently and complicatedly changed, with the result that the operator cannot confirm the error contents and error generation positions. Further the prior art system has had another problem that, since an error history is not recorded, the operator cannot judge the state of the currently generated error. In more detail, though the error generation states include generation of a multiplicity of errors at a multiplicity of locations, generation of a multiplicity of errors at a small number of regular locations, generation of a small number of errors at a multiplicity of locations, and error generation at a very low frequency, the prior art system cannot discriminate to which one of those states the current error belongs.

In view of such circumstances, it is an object of the present invention to provide an error display device of a data transmission system capable of easily confirming the display content regarding errors and the state of the current error.

DISCLOSURE OF INVENTION

In accordance with the present invention, there is provided an error display device of a data transmission system in which a plurality of nodes are connected to a main controller to transmit data, the main controller being adapted to discriminate an error content and an error position from an error signal contained in a data frame signal transmitted from the nodes and to display the error content and the error position, in which the main controller comprises temporary memory means for temporarily storing therein a signal corresponding to the error content and the error position; update control means for intermittently validating memory updating operation of the temporary memory means when a predetermined operation instruction is inputted; error counting means for counting the number of the input error signals and display means for displaying outputs of the temporary memory means and the error counting means. The intermittent updating control includes a method for validating the storage updating operation of the temporary memory means according to an operator's instruction and a method for arbitrarily automatically setting a timing of validating the storage updating operation under control of a program.

With such an arrangement, the storage content of the temporary memory means is not updated each time the error signal is inputted but updated intermittently. In the case where the storage updating operation of the temporary memory means is validated according to the operator's instruction, the error content and the error position displayed on the display means are rewritten only when the operator gives the instruction. For example, the storage updating operation of the temporary memory means becomes validated only when the error signal is inputted first after the operator's instruction, at which time the error content and the error position on the display means are rewritten to the data associated therewith.

Accordingly, when errors frequently take place at a plurality of different locations, issuance of the operator's instruction causes the error display contents to be held, whereby the operator can positively confirm the display contents. Further, since the counted number of such error signals is displayed, the operator can easily confirm the error generation state.

Therefore, in accordance with the present invention, since the error display is intermittently realized, even when errors frequently take place at a multiplicity of locations, that is, even when it is difficult for the operator to confirm the error display contents, the operator can positively confirm the error contents. In addition, since the accumulated number of errors is also displayed, when the error display is carried out continually, the operator can readily confirm the state of errors being generated currently.

BEST MODE FOR CARRYING OUT THE INVENTION

An embodiment of the present invention will be detailed with reference to the attached drawings.

Figure 1:
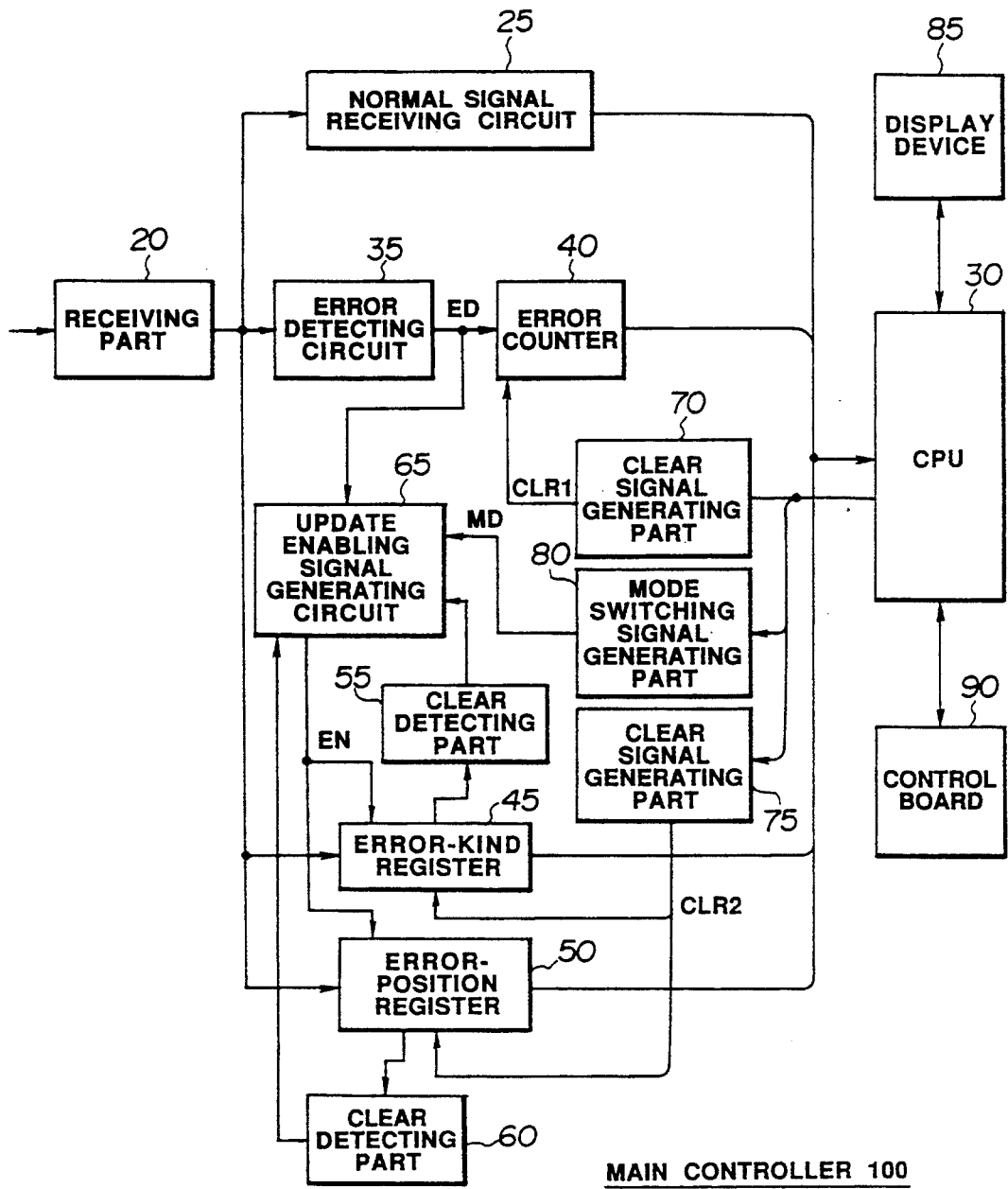
FIG. 1 is a block diagram of an embodiment of the present invention.
Figure 4:
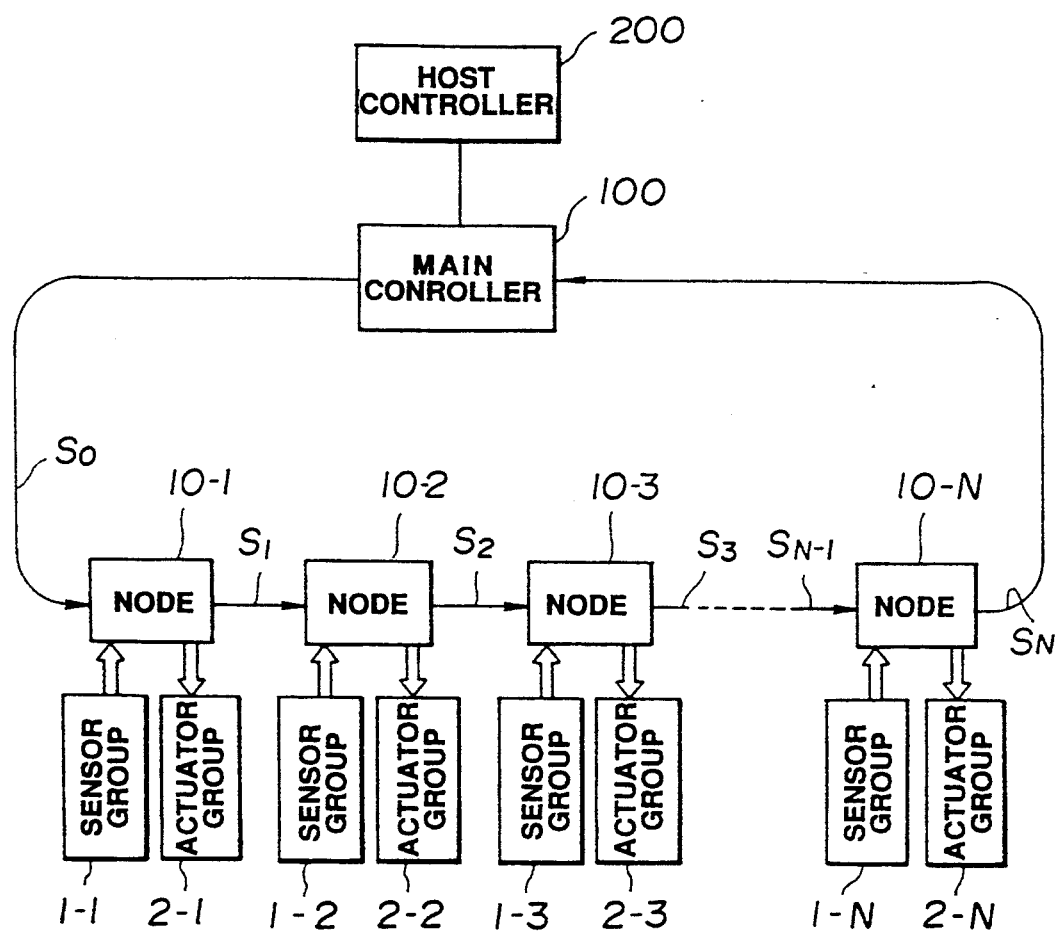
FIG. 4 is a block diagram of a general arrangement of a series control system to which the present invention is applied.

FIG. 1 shows an interior structure of a main controller 100 in accordance with the present invention which is applied to the series control system of FIG. 4.

A data frame signal (refer to FIG. 5) having actuator control data DO removed and attached by sensor detection data through its sequential propagation of nodes 10-1 to 10-N is sent to a receiving part 20 of the main controller 100 of FIG. 1 to be demodulated thereat. A normal signal receiving circuit 25, when receiving a data frame signal from the receiving part 20, subjects the received data frame signal to a normal receiving operation and sends its output signal to a CPU 30.

An error detecting circuit 35 receives the bit Ea in an error signal ERR (refer to FIG. 6) attached to the end of the data frame signal and indicative of the presence or absence of an error and a code CRC in the data frame signal, judges "1" or "0" in the bit Ea to detect the presence or absence of an error. And the error detecting circuit 35, when the bit Ea is "0", detects the error in the data frame signal through CRC check. When detecting the error in this way, the error detecting circuit 35 inputs a detection signal ED to an error counter 40 and an update enabling signal generating circuit 65. The error counter 40 counts the received detection signal ED and outputs a counted value to the CPU 30.

Figures 5, 6:
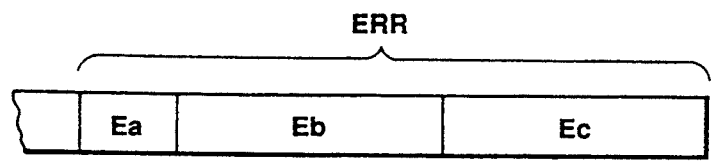
FIG. 5 shows propagation states of a data frame signal.
FIG. 6 is a diagram for explaining a frame-structure of an error signal.

An error kind register 45 is used to temporarily store therein an error kind code Eb in the error signal ERR (refer to FIG. 6); while an error position register 50 is used to temporarily store therein data Ec of the error position area in the error signal ERR (refer to FIG. 6). The data stored in the registers 45 and 50 are inputted to the CPU 30.

Figure 2:
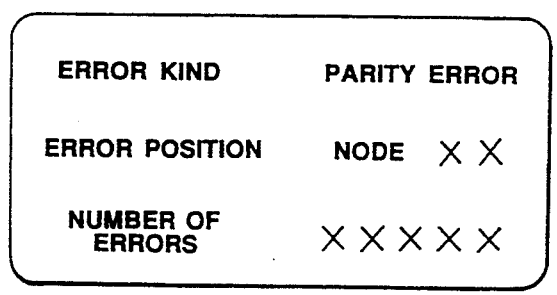
FIG. 2 shows an example of an error display screen.

The CPU 30, which is connected to a display device 85 and also to a control board 90, operates to perform its ordinary processing based on the data received from the normal signal receiving circuit 25 and also to control data or error contents to be displayed on the display device 85. FIG. 2 is an example of window showing error contents to be displayed on the display device 85, in which case "error kind", "error position" and "number of errors" are given. More specifically, the CPU 30 decodes the data contents of the error kind register 45, displays the decoded contents at the column "error kind", judges the error position through its reverse calculation of the data contents of the error position register 50, displays the judgment result at the column "error position", and further displays the data contents of the error counter 40 at the column "number of errors".

The control board 90 has an array of keys through which the operator enters a command to the CPU 30. When it is desired to clear the error counter 40, a signal indicative of the clearing of the error counter is sent via the control board 90 to the CPU 30. Even when it is desired to clear the error kind register 45 and the error position register 50, similarly, a signal indicative of such effect is sent via the control board 90 to the CPU 30.

The CPU 30, when receiving these clear signals, sends a command to a clear signal generating parts 70 and 75 respectively.

The clear signal generating part 70 generates a clear signal CLR1 to the error counter 40 in accordance with the command received from the CPU 30 and inputs the signal CLR1 to the error counter 40. The clear signal generating part 75 similarly generates a clear signal CLR2 to the error kind register 45 and the error position register 50 in accordance with the command received from the CPU 30 and in puts the signal CLR2 to these registers.

With this device, the operator can arbitrarily select one of two error display modes through operator's operation of the control board.

In the first display mode, each time the error frame (the data frame signal containing the error signal ERR having the bit Ea of "1") is inputted, the error kind register 45 and the error position register 50 are intended to be updated. In this first display mode, the "error kind" and "error position" of the error display data shown in FIG. 2 are freely updated and displayed according to the data contents of the error king register 45 and the error position register 50. The first display mode is a conventional error display mode.

The second display mode is an intermittent display mode in which, only when the operator instructs it, the error kind and position registers 45 and 50 can be updated. More specifically, in this mode, the data of the error kind and position registers 45 and 50 are kept at the previous data until the operator instructs it and when the operator instructs it, the registers are cleared. Thereafter, when an error frame is inputted, the registers are updated to their contents corresponding to the inputted error frame, That is, in the second display mode, only when the operator instructs it, the "error kind" and "error position" of FIG. 2 can be updated and displayed. In other words, in the second display mode, in the absence of the operator's instruction, the data contents of the error kind and position registers 45 and 50 are kept unchanged at all "0" which have been caused by a clear instruction or at the data contained in the error frame first inputted after the previous operator's instruction.

A mode switching signal generating part 75, when receiving a signal instructing the first or second display mode from the CPU 30, generates a mode switching signal MD for identification of these modes and inputs the signal MD to the update enabling signal generating circuit 65.

A clear detecting part 55 detects that the storage data of the error kind register 45 was cleared, in other words, the bits of the error kind code Eb are all "0". Similarly, a clear detecting part 60 detects that the storage data of the error position register 50 was cleared, in other words, the bits of the error kind code Ec are all "0". The detection data of these clear detecting parts 55 and 60 are inputted to the update enabling signal generating circuit 65.

The update enabling signal generating circuit 65 outputs an enable-signal EN to the error kind and position registers 45 and 50, whereby the enable signal EN causes the error kind and position registers 45 and 50 to be activated so that the storage contents of these registers are updated by their input data.

More specifically, the update enabling signal generating circuit 65, when detecting on the basis of the mode switching signal MD that the first display mode was selected, operates to input the enable signal EN to the error kind and position registers 45 and 50 at a predetermined timing each time the update enabling signal generating circuit 65 receives the detection signal ED from the error detecting circuit 35. Thus, when the error detecting circuit 35 detects an error, the data contents of the error kind and position registers 45 and 50 are correspondingly positively updated by the then data contents. Accordingly, the error display contents of the display device 85 correspond surely to the error signal inputted at a time point.

However, the update enabling signal generating circuit 65, when detecting on the basis of the mode switching signal MD that the second display mode was selected, determines according to the output states of the clear detecting parts 55 and 60 whether to output the enable signal EN. More specifically, when the detection signals are output from the clear detecting parts 55 and 60, this is when the clear signal generating part 75 outputs the clear signal CLR2 and the data contents of the error kind and position registers 45 and 50 becomes all "0", in other words, this is when the operator conducts a predetermined operation through the control board 90 to clear the error kind and position registers 45 and 50, or when the device is started. The update enabling signal generating circuit 65, when receives the detection signals from the clear detecting parts 55 and 60, outputs the enable signal only once when receiving the error detection signal ED for the first time after the detection signals are received. After the first output of the enable signal, even when the error detection signal ED is inputted, the detection signals of the clear detecting parts 55 and 60 are not detected and thus the update enabling signal generating circuit 65 does not output the enable signal For this reason, the data contents of the error kind and position registers 45 and 50, after the operator conducts the predetermined operation to clear the registers, are updated to the data of the error kind code Eb and error position area Ec contained in the error frame, after which these updated data are not changed until the next operator's operation to clear the registers. Therefore, in the second display mode, after the operator conducts the predetermined operation to clear the registers, the error display contents of the display device 85 correspond to the data of the error kind code Eb and error position area Ec contained in the error frame, whereby, even an error signal having different error contents is inputted thereafter, the display contents will not be updated.

Figure 3:
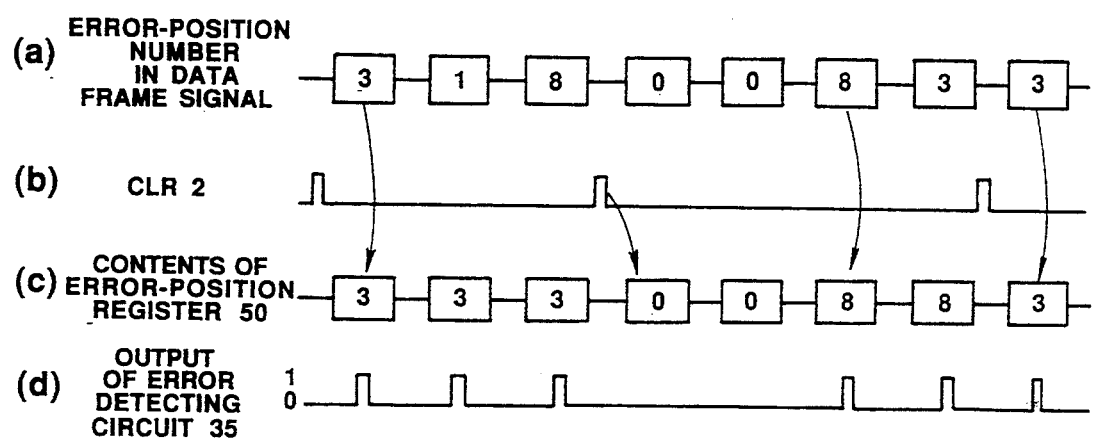
FIG. 3 is a timing chart for explaining the operation of the embodiment.

FIG. 3 shows an example of the updated state of the error position register 50 when the second display mode is selected in the case where errors frequently take place at a multiplicity of locations. In the example of FIG. 3, immediately after the operator inputs the clear signal CLR2, the contents of the error position register 50 become all "0", after which the contents of the register 50 are kept at the data corresponding to the data of the error position area Ec contained in an error frame first inputted after the input of the clear signal.

Therefore, in accordance with the present embodiment, in the event where it is difficult to confirm error display contents as when errors take place at a multiplicity of locations, the selection of the second display node enables the error display contents not" to be changed until operator's instruction is issued, so that the operator can confirm the error contents. And after confirming the error contents, the operator may conduct a predetermined operation to clear the error kind and position registers 45 and 50. Further, when the second mode is selected, the repetitive execution of the confirmation of the aforementioned error display contents and the clear operation for some time enables the detection of such an error position number "1", which would not be confirmed in the example of FIG. 3 at the time of frequent error generation. In addition, in accordance with the present embodiment, since the accumulated number of errors can be displayed, when the first display mode is selected, the operator can readily confirm where errors are generated and the number of such errors at the current time.

Although the second mode has been explained to clear the error kind and position registers 45 and 50 only when the operator gives the instruction in the foregoing embodiment, the second mode may be automatically carried out under control of a program. In this connection, the error kind and position registers 45 and 50 may be cleared at intervals of a predetermined number of times previously set by the program to realize intermittent display.

Though explanation has been made in connection with the case where the present invention is applied to the series control system having nodes connected in a loop form in the foregoing embodiment, the present invention may be applied to such a bus-connected, star-connected, or series-connected local area network.

Industrial Applicability

The present invention can be suitably employed for displaying errors in a system which centralizedly controls presses, machine tools, construction machines, ships, airplanes, unmanned carrier machines, unmanned warehouses or the like.

I claim:

1. An error display device of a data transmission system in which a plurality of nodes are connected to a main controller to transmit data, the main controller being adapted to discriminate presence or absence of an error, an error content and an error position from an error signal contained in a data frame signal transmitted from the nodes and to display the error content and error position wherein the main controller comprises:

an error kind register for temporarily storing therein a signal corresponding to the error content;

an error position register for temporarily storing therein a signal corresponding to the error position;

clear operating means for instructing to clear storage data in the error kind register and the error position register;

update control means having a first mode in which the storage data in the error kind register and the error position register are updated each time an error is detected as well as a second mode in which storage data in the error kind register and the error position register are cleared when a clear instruction from the clear operating means is inputted, the data in the error kind register and the error position register being updated by the error content and the error position when an error is detected first after the clear instruction, and thereafter the updating of the error kind register and the error position register is disabled until a next clear instruction of the clear operating means is inputted, the update control means controlling storage updating operations of the error kind register and the error position register in either one of said two modes;

error counting means for counting the number of errors detected in the error signal; and display means for displaying thereon the temporary storage data in the error kind register and the error position register and an output of the error counting means.

2. An error display device of a data transmission system in which a plurality of nodes are connected to a main controller to transmit data, the main controller being adapted to discriminate presence or absence of an error, an error content and an error position from an error signal contained in a data frame signal transmitted from the nodes and to display the error content and error position, wherein the main controller comprises:

error detecting means for detecting generation of an error on the basis of the error signal;

an error kind register for temporarily storing therein a signal corresponding to the error content;

an error position register for temporarily storing therein a signal corresponding to the error position;

clear operating means for instructing to clear storage date in the error kind register and the error position register;

display mode selecting means for selecting one of two display modes;

clear signal generating means, when a clear instruction is issued from the clear operating means for, in response to a clear instruction being issued, outputting a clear signal to clear the storage data in the error kind register and the error position register;

clear detecting means for detecting the cleared storage data in the error kind register and the error position register;

update control means for, in response to selection of the first one of the two display modes, updating the storage data in the error kind register and the error position register by a corresponding error content and error position each time an error signal is outputted from the error detecting means and, when the second one of the two display modes is selected, for updating the data in the error kind register and the error position register by the error content and the error position only when an error detection signal is outputted the first time after a clear detection signal is outputted from the clear detecting means;

error counting means for counting the number of errors detected detected in the error signal; and display means for displaying thereon the temporary storage data in the error kind register and the error position register and an output of the error counting means.

* * * * *